(12) United States Patent
Kinkead et al.

(10) Patent No.: US 9,474,196 B2
(45) Date of Patent: Oct. 25, 2016

(54) APPARATUS FOR AERATING TURF INCLUDING POSITIONABLE TRANSPORT WHEELS

(75) Inventors: George Kinkead, Mendota Heights, MN (US); Steven Ferguson, Scandia, MN (US); Terrence R. Bondeson, Woodbury, MN (US); Tom Fiske, Brooklyn Park, MN (US); Roger Lee Larson, Shoreview, MN (US)

(73) Assignee: Turfco Manufacturing, Inc., Blaine, MN (US)

( * ) Notice: Subject to any disclaimer, the term of this patent is extended or adjusted under 35 U.S.C. 154(b) by 0 days.

(21) Appl. No.: 13/282,095

(22) Filed: Oct. 26, 2011

(65) Prior Publication Data
US 2012/0103641 A1 May 3, 2012

Related U.S. Application Data (60) Provisional application No. 61/407,126, filed on Oct. 27, 2010.

(51) Int. Cl.
*A01B 45/00* (2006.01)
*A01B 45/02* (2006.01)

(52) U.S. Cl.
CPC ..................................... *A01B 45/02* (2013.01)

(58) Field of Classification Search
CPC .. A01B 45/02; A01B 45/023; A01B 45/026; A01B 33/087
USPC ....... 172/21, 22, 42, 122, 123, 540, 43, 541, 172/662
See application file for complete search history.

(56) References Cited

U.S. PATENT DOCUMENTS

| | | | |
|---|---|---|---|
| 1,157,670 | A | 10/1915 | Boswell |
| 1,778,334 | A | 10/1930 | Pedersen |
| 1,807,182 | A | 5/1931 | Stoner |
| 2,205,997 | A | 6/1940 | Wallace et al. |

(Continued)

FOREIGN PATENT DOCUMENTS

| AU | 256472 | 5/1963 |
|---|---|---|
| EP | 0140989 | 5/1985 |

(Continued)

OTHER PUBLICATIONS

Plugr Walk Behind Power Aerators, web page, (5 pgs.)—no date—.
Billy Goat Industries—EZair Aerators, web page (2 pgs.)—no date—.

(Continued)

*Primary Examiner* — Árpád Fábián-Kovács
(74) *Attorney, Agent, or Firm* — Alan D. Kamrath; Kamrath IP Lawfirm, P.A.

(57) ABSTRACT

Tine assemblies (100a, 100b, 104) are secured by a single bolt (126) extending diametrically through each tine (120) located in a cavity (112) of a tine plate (110). An outer tine assembly (104) is connected to a sleeve (116) rotatably mounted on independently rotatable shafts (102) to which inner tine assemblies (100a, 100b) are connected. A tine cover (50) removably closes an opening (40) in the top plate (28) and in which weights (70) are removably received over the tine assemblies (100a, 100b, 104). Transport wheels (134) are moveable by pivoting a stop plate (140) to position an upper pivot axis (150a) of an abutment bar (150) ahead of or behind the stop axis (142) and lower pivot axis (150b). A stop (146) positioned on the stop plate (140) without the use of tools adjusts the depth of the tine assemblies (100a, 100b, 104).

17 Claims, 9 Drawing Sheets

(56) References Cited

U.S. PATENT DOCUMENTS

| | | | |
|---|---|---|---|
| 2,229,497 A | 1/1941 | Dontje | |
| 2,234,534 A | 3/1941 | Reno | |
| 2,244,099 A | 6/1941 | Chase | |
| 2,260,110 A | 10/1941 | Blohm | |
| 2,400,204 A * | 5/1946 | Lindskog | 172/21 |
| 2,649,061 A | 6/1953 | Hawkins et al. | |
| 2,675,750 A | 4/1954 | Boyer | |
| 2,750,859 A | 6/1956 | Smithburn | |
| 2,823,597 A | 2/1958 | Cadwallader | |
| 2,835,182 A | 5/1958 | Smithburn | |
| 2,888,994 A | 6/1959 | Hoff et al. | |
| 3,171,498 A | 3/1965 | Logan | |
| 3,504,748 A * | 4/1970 | Croft | 172/42 |
| 3,675,724 A | 7/1972 | Schneider | |
| 3,792,734 A * | 2/1974 | Ellis et al. | 172/43 |
| 4,089,387 A | 5/1978 | Cook | |
| 4,289,224 A | 9/1981 | Dobberpuhl | |
| 4,336,760 A | 6/1982 | Cohen et al. | |
| 4,438,873 A | 3/1984 | Kaercher, Jr. | |
| 4,550,783 A | 11/1985 | Hansen | |
| 4,645,012 A | 2/1987 | Hansen et al. | |
| 4,750,565 A | 6/1988 | Hansen et al. | |
| 4,753,298 A | 6/1988 | Hansen et al. | |
| 4,776,404 A | 10/1988 | Rogers et al. | |
| 4,830,145 A | 5/1989 | Hansen | |
| 4,867,244 A | 9/1989 | Cozine et al. | |
| 4,881,602 A | 11/1989 | Hansen et al. | |
| 5,009,270 A | 4/1991 | Vangsgard | |
| 5,029,652 A | 7/1991 | Whitfield | |
| 5,036,655 A | 8/1991 | Holloway | |
| 5,119,880 A | 6/1992 | Zehrung, Jr. et al. | |
| 5,142,852 A | 9/1992 | Nelson | |
| 5,207,278 A | 5/1993 | Hatlen | |
| 5,209,306 A | 5/1993 | Whitfield | |
| 5,307,952 A | 5/1994 | Worrel et al. | |
| 5,307,965 A | 5/1994 | Worrel | |
| 5,454,433 A | 10/1995 | Worrel et al. | |
| 5,460,229 A | 10/1995 | Mattis | |
| 5,478,104 A | 12/1995 | Worrel et al. | |
| 5,571,252 A | 11/1996 | Worrel et al. | |
| 5,586,604 A | 12/1996 | Postema | |
| 5,673,756 A | 10/1997 | Classen | |
| 5,680,903 A | 10/1997 | Oliver | |
| 5,794,708 A | 8/1998 | Brophy | |
| 5,802,994 A | 9/1998 | Kinkead et al. | |
| 5,823,269 A | 10/1998 | Leclerc | |
| 6,024,033 A | 2/2000 | Kinkead et al. | |
| 6,041,869 A | 3/2000 | Lewis et al. | |
| 6,058,860 A | 5/2000 | Kinkead et al. | |
| 6,102,129 A | 8/2000 | Classen | |
| 6,149,079 A | 11/2000 | Kinkead et al. | |
| 6,151,811 A * | 11/2000 | Barreto | 37/352 |
| 6,179,061 B1 | 1/2001 | Fiore | |
| 6,200,066 B1 | 3/2001 | Humphrey | |
| 6,241,025 B1 | 6/2001 | Myers et al. | |
| 6,273,197 B1 | 8/2001 | Marlow | |
| 6,415,872 B2 | 7/2002 | Myers et al. | |
| 6,708,773 B1 * | 3/2004 | Kinkead et al. | 172/21 |
| 7,779,929 B2 * | 8/2010 | Maas et al. | 172/21 |
| 8,079,422 B2 * | 12/2011 | Maas et al. | 172/21 |
| 2004/0154811 A1 * | 8/2004 | Kinkead et al. | 172/21 |

FOREIGN PATENT DOCUMENTS

| | | |
|---|---|---|
| GB | 472443 | 9/1937 |
| GB | 1558467 | 1/1980 |
| GB | 2347400 | 9/2000 |

OTHER PUBLICATIONS

Classen Manufacturing, Inc., web page (2 pgs.)—no date—.
BlueBird International Products—Turf Care, web page (1 pg.)—no date—.
BlueBird Internation Products—Turf Care-424, web page (2 pgs.)—no date—.

* cited by examiner

APPARATUS FOR AERATING TURF INCLUDING POSITIONABLE TRANSPORT WHEELS

CROSS REFERENCE

The present application claims benefit to U.S. Provisional Application No. 61/407,126 filed Oct. 27, 2010.

BACKGROUND

Methods and apparatus for aerating turf are shown and described.

The conception of a pair of tine shafts driven through a differential shaft in a turf aerator as taught in U.S. Pat. No. 6,708,773, which is hereby incorporated herein by reference, represented a major innovation in the turf field. In particular, the ability to operatively connect and clutch one or the other or both of the tine shafts, whether done mechanically, hydrostatically, or in other manners or combinations, allow the operator to make turns while the tines are still in contact with the turf. However, once turning was a possibility, operators desired further ability in directing the turf aerator during operation.

As an example, in an alternate approach by others to this major innovation, outer tine assemblies were rotatably mounted at the two end portions of a single driven shaft including inner tine assemblies secured to the single driven shaft intermediate the outer tine assemblies. Although increasing turning ability relative to conventional turf aerators existing prior to U.S. Pat. No. 6,708,773, this alternate approach did not have the turning ability achieved by the turf aerator of U.S. Pat. No. 6,708,773.

Further, during normal operation of the turf aerator, the tines need servicing such as the result of blockage and breakage. Such servicing was performed from underneath the conventional turf aerator which was often held in a tilted condition. Furthermore, replacement of tines was difficult to accomplish by the operator, and tine reel assemblies utilized were difficult and expensive to manufacture and assemble.

Likewise, to provide penetration of the tines into the turf, weights are removably attached to the sides of the chassis in conventional turf aerators. It can then be appreciated that such removable weights increased the overall mass which resulted in increased operator fatigue and apparatus wear as well as reduced maneuverability.

Additionally, conventional turf aerators utilized various arrangements to position transport wheels relative to the chassis to allow transport without tine engagement as well as to control the depth of tine penetration. However, such arrangements were relatively complicated in design increasing cost and maintenance as well as requiring tools for adjustment.

Thus, need for improvement in methods and apparatus for aerating exists in the field of turf management.

SUMMARY

This need and other problems in the field of turf management are solved by providing an outer tine assembly rotatably mounted adjacent an outer end of each of first and second shafts each having an inner tine assembly secured thereto for rotation therewith. A turf aerator independently driving the first and second shafts, such as by a hydrostatic transaxle, has enhanced and unexpected ability to be directed by operators during operation and while the tine assemblies are in contact with the turf.

Further, each of a plurality of tines of the tine assembly are secured by a single bolt extending diametrically through each tine located in a cavity of a tine plate, with the plurality of cavities being arranged in a non-intersecting manner in the tine plate. The tine plates of the inner tine assemblies are connected directly or through an attachment ring to the shafts, while the tine plates of the outer tine assemblies are connected directly or through an attachment ring to a sleeve rotatable on the shafts.

Additionally, a tine cover is removably secured to the chassis and closes an opening in the top plate of the chassis positioned over the tine assembly of the turf aerator. Maintenance and replacement of the tine assembly can be accomplished, after removing the tine cover, through the opening. Thus, tilting the chassis to provide access from underneath the tine assembly as required in conventional turf equipment is avoided.

Furthermore, weights are slideably received in a tine cover located over the tine assembly to be positioned intermediate the first and second side plates of the chassis and over the tine assembly. Positioning the removable weights generally centered over the tine assembly provides increased leverage which was not obtained by conventional turf aerators. Also, the weights can be removed from the tine cover if the tine cover is removed from the chassis such as for maintaining or servicing the tine assembly.

In other aspects, transport wheels are mounted on ends of arms having their opposite ends pivotally mounted to the chassis. Abutment bars are pivotally mounted to the arms and to stop plates pivotally mounted to the chassis. The transport wheels can be pivoted between transport and operational positions where the upper pivot axes of the abutment bars are located in front or behind of the lower pivot axes of the abutment bars and the pivot axes of the stop plates. Pivoting of the stop plates can be easily accomplished such as by lift tubes pivotally connected to the stop plates and a lift handle pivotally mounted to the handlebar. The extent that the transport wheels move towards the chassis is limited by stops connected to the stop plates and abutting with the abutment bars in the operational position. Thus, the extent can be adjusted easily without the use of tools by simply changing the position of the stops in the stop plates.

Illustrative embodiments will become clearer in light of the following detailed description in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

Figure 1:
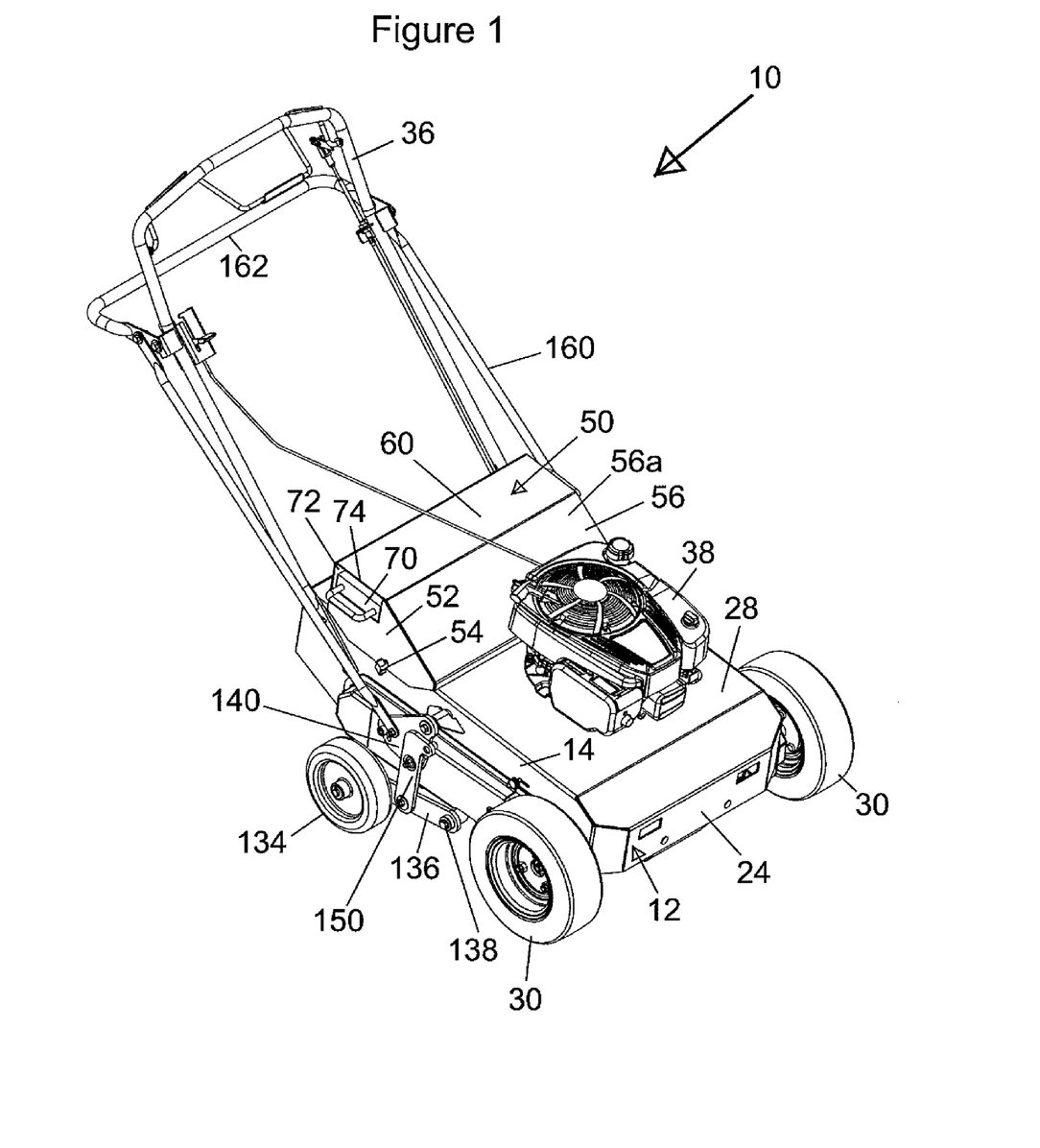
FIG. 1 shows a front, perspective view of an embodiment of an apparatus for aerating turf.
Figure 2:
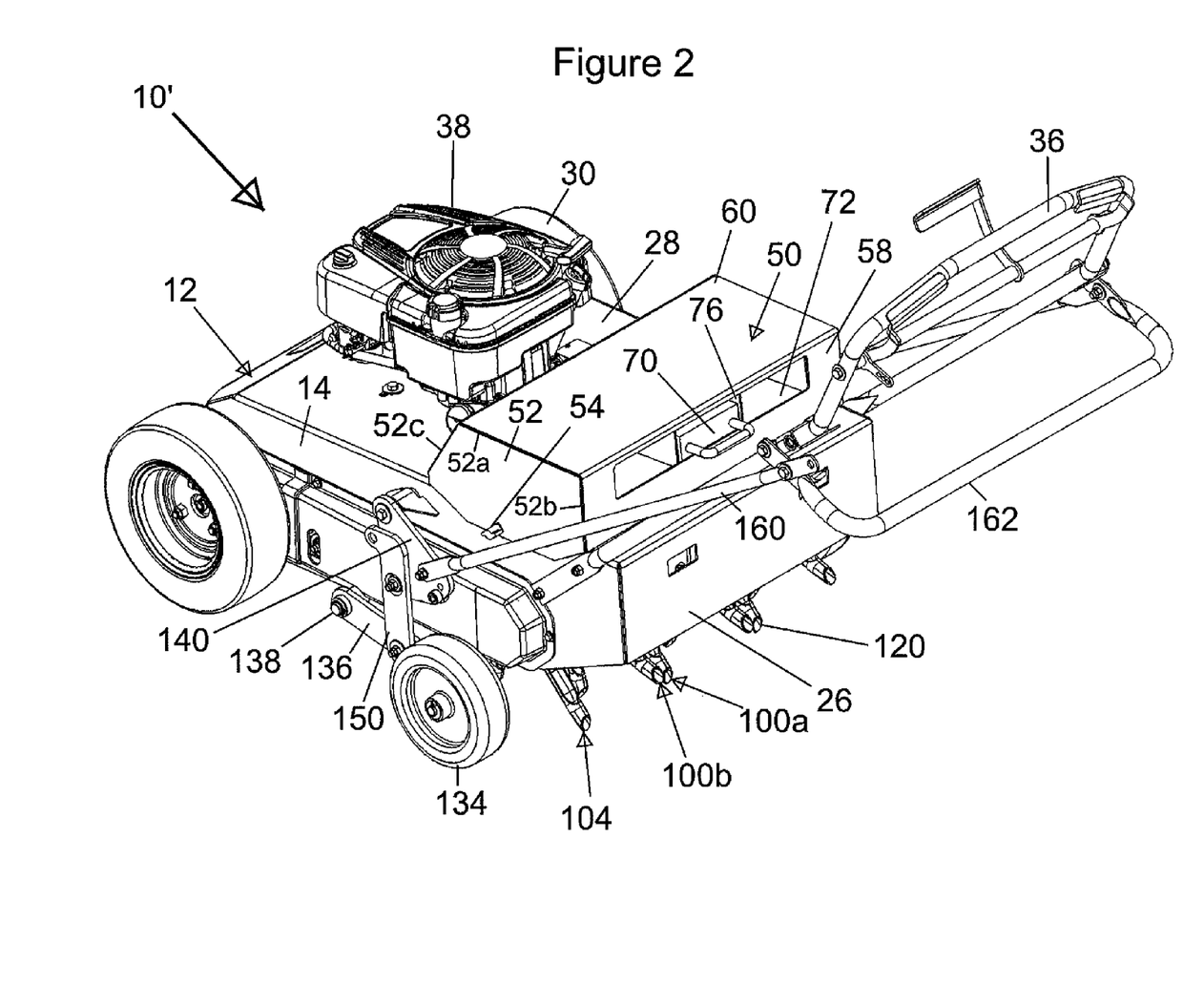
FIG. 2 shows a rear, perspective view of another embodiment of an apparatus for aerating turf.
Figure 3:
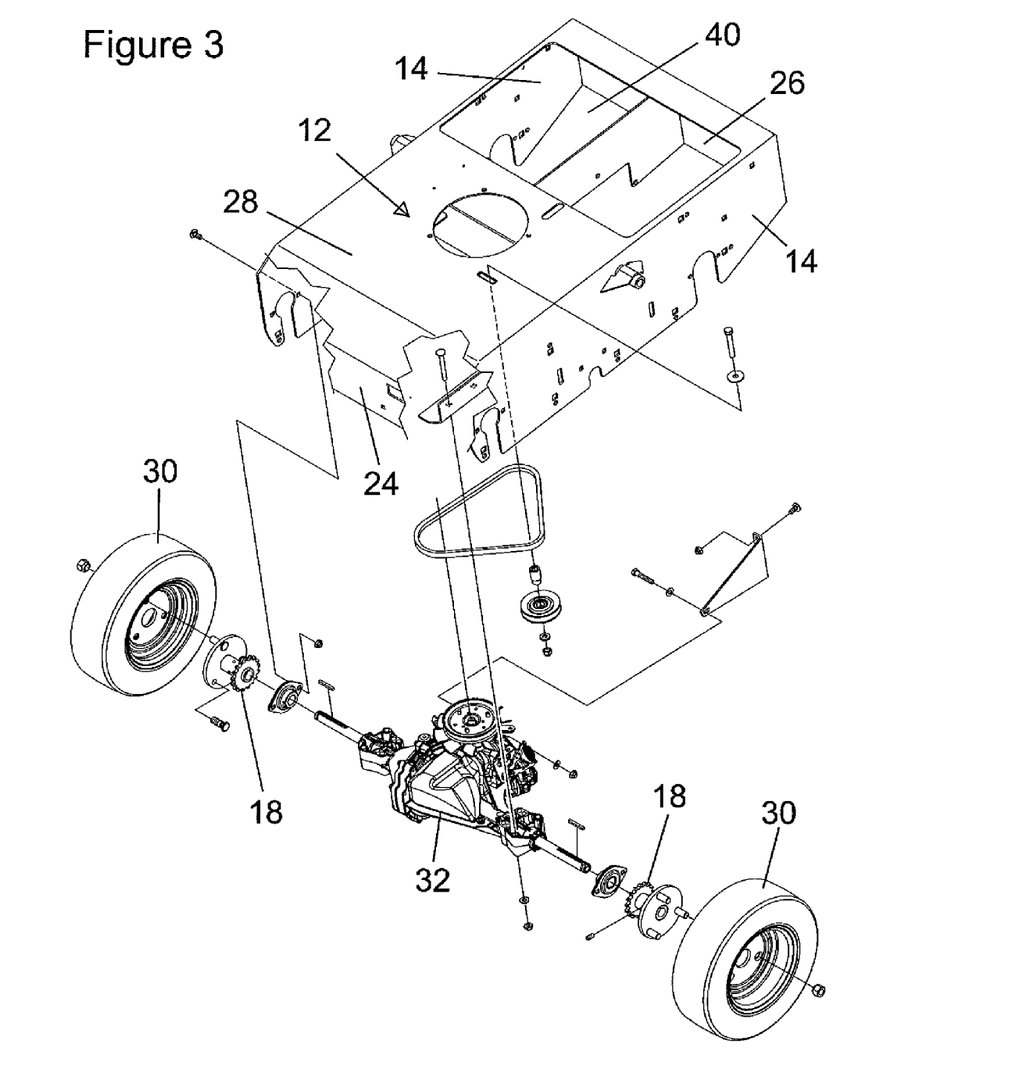
FIG. 3 shows an exploded perspective view of the chassis, transaxle, V-belt and front wheels of the aerating apparatus of FIGS. 1 and 2.

Illustrative embodiments of an apparatus for aerating turf are shown in the drawings and generally designated 10 and 10'. Generally, turf aerator 10 and 10' includes a chassis 12 including first and second side plates 14, front and back plates 24 and 26 extending between side plates 14, and a top plate 28 extending between side plates 14 and between front and back plates 24 and 26. In the form shown, top plate 28 is generally rectangular. Chassis 12 is moveably supported on turf adjacent to front plate 24 by wheels 30 at opposite ends of a hydrostatic transaxle 32, with wheels 30 located outwardly of side plates 14. A handlebar 36 extends from chassis 12 in a direction away from front plate 24 and wheels 30.

A motor 38 is mounted to top plate 28 adjacent to front plate 24. Motor 38 is in driving connection to hydrostatic transaxle 32 such as by a belt drive arrangement.

Figure 4:
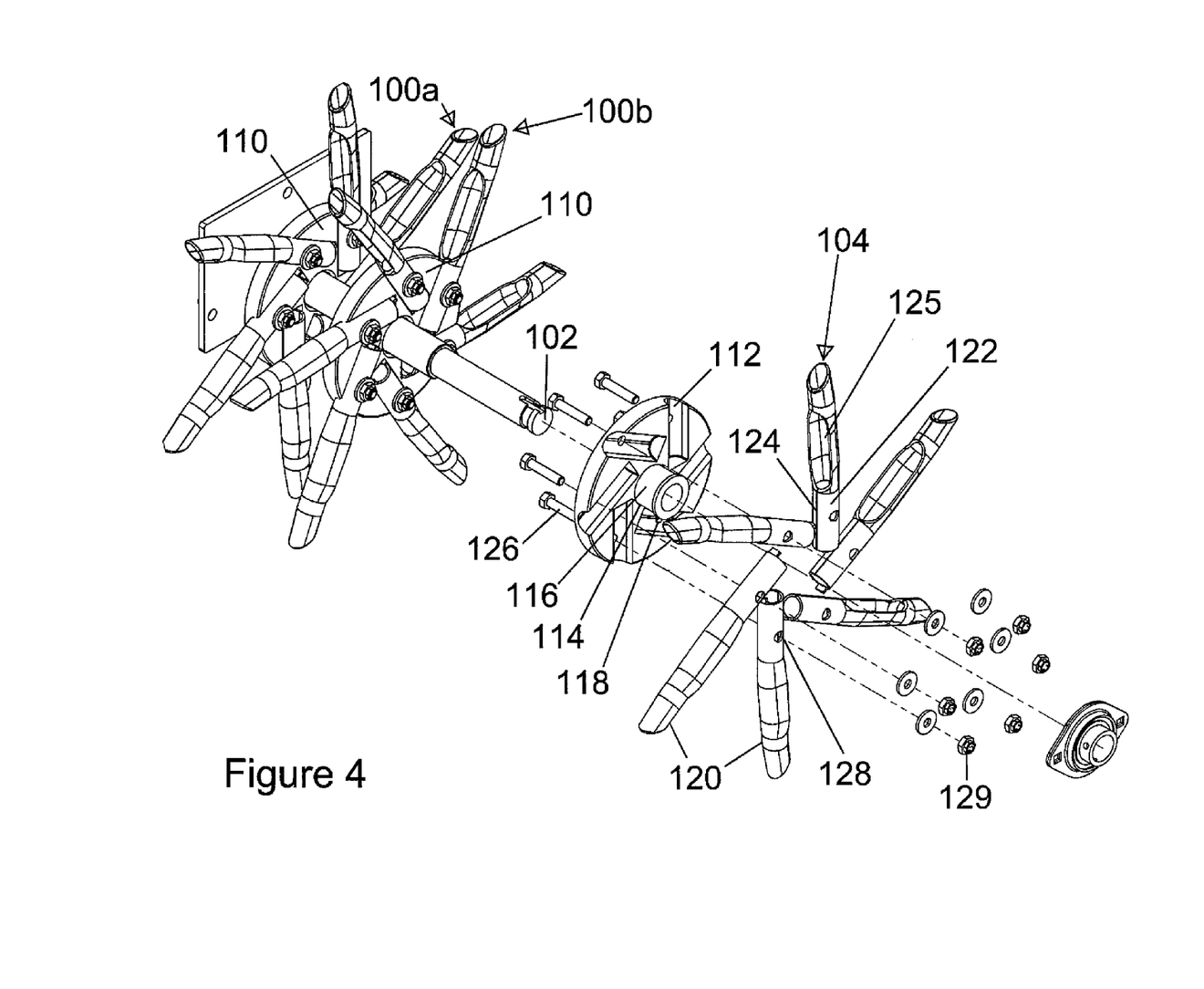
FIG. 4 shows an exploded perspective view of the tine reel assemblies of the aerating apparatus of FIG. 1.
Figure 5:
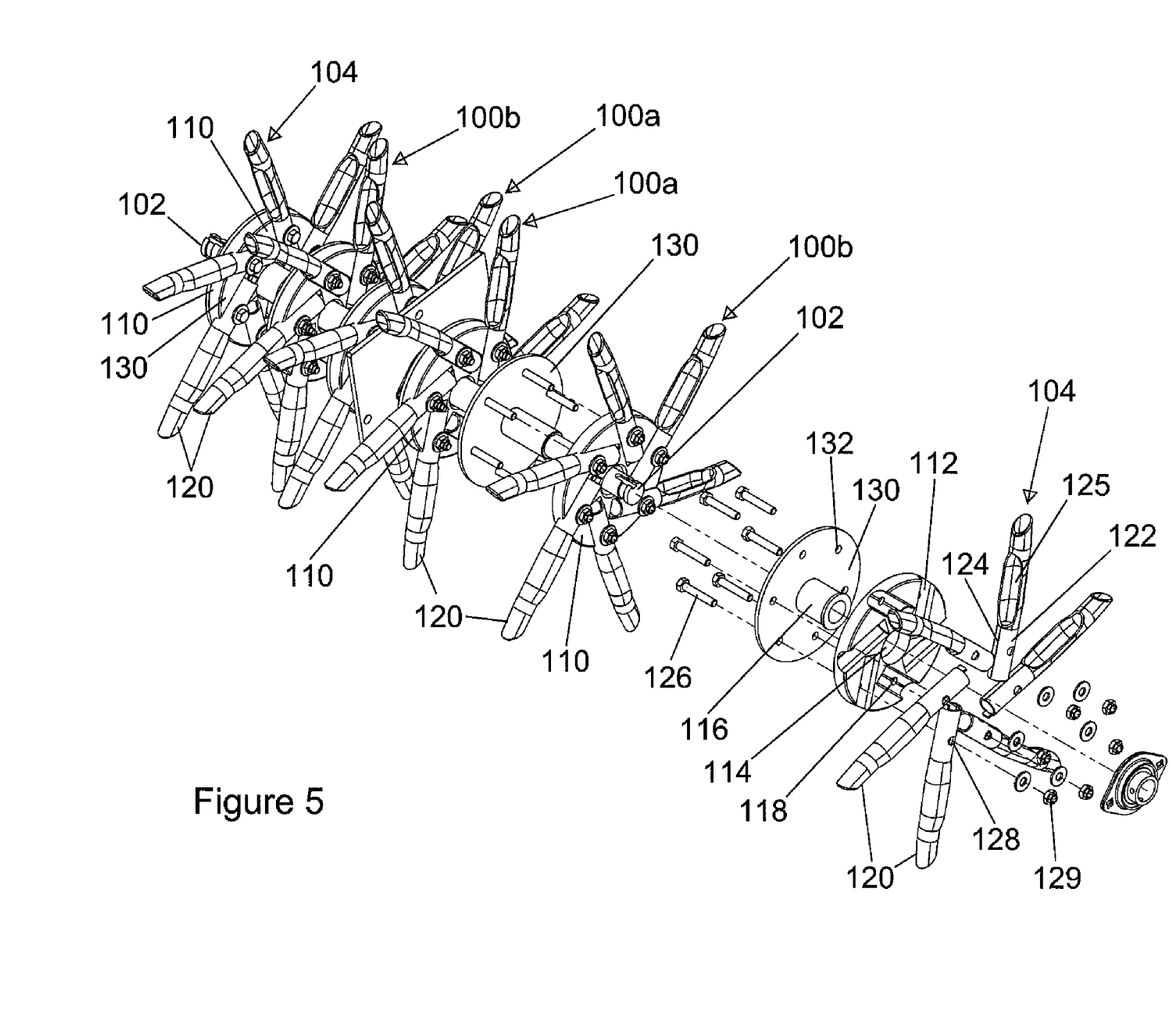
FIG. 5 shows an exploded perspective view of the tine reel assemblies of the aerating apparatus of FIG. 2.

In the embodiments shown, a pair of inner tine assemblies 100a and 100b are secured to a shaft 102 each driven at the outer end by a sprocket 18 and a roller chain by hydrostatic transaxle 32. Floating, outer tine assembly 104 is rotatably supported on shaft 102. It should be appreciated that tine assembly 104 is located axially outward of tine assemblies 100a and 100b. Specifically, inner tine assemblies 100a and 100b are secured to shaft 102 adjacent to its inner end and are rotatable with shaft 102. Outer tine assembly 104 is rotatably mounted to shaft 102 and is located intermediate the inner tine assemblies 100a and 100b and the outer end of shaft 102. Inner tine assembly 100b is intermediate inner tine assembly 100a and outer tine assembly 104. Shaft 102 is driven at the outer end outwardly of outer tine assembly 104. In the embodiments shown, first and second shafts 102 are independently rotatable about a tine axis with their inner ends located intermediate their outer ends and are independently driven at their outer ends outwardly of outer tine assemblies 104. Each first and second shaft 102 includes tine assemblies 100a, 100b and 104 as described hereintofore. First and second shafts 102 and tine assemblies 100a, 100b and 104 are rotatably mounted to chassis 12 between side plates 14 and adjacent to back plate 26. Shafts 102 and tine assemblies 100a and 100b are driven by motor 38 through hydrostatic transaxle 32. This arrangement provides unexpected, surprising, and synergistic results compared to turf aerators which had all tine wheels driven or where the floating tine wheels were located intermediate the driven tine assemblies. In particular, providing outer tine assembly 104 rotatable adjacent only the outer end or end portion rather than adjacent to both ends or end portions of a single shaft 102 results in abilities to direct turf aerator 10 and 10' during operation which was not previously contemplated and which was unexpected and surprising in the field.

Further, in the embodiments shown, tine assemblies 100a, 100b and 104 each includes a circular tine plate 110 including a plurality of non-intersecting, generally semi-circular cross section cavities 112 extending along chords spaced from but parallel to diameters of the circular tine plate 110. Each tine plate 110 includes an axial bore 114.

Each tine assembly 100a, 100b and 104 includes a plurality of tines 120. Each tine 120 is formed by bending a flat sheet 122 of metal into a tubular shape. The abutting edges 124 of the flat sheet 122 each includes a cutout 125 to define a rear opening in the tubular shape. Each tine 120 is held in a cavity by a single bolt 126 extending through a through hole 128 extending diametrically through the tubular shape of the tine 120 and generally at 90° to abutting edges 124 and tine plate 110.

In one embodiment, axial bores 114 of tine plates 110 of tine assemblies 100a and 100b are welded to shaft 102, while axial bore 114 of tine plate 110 of tine assembly 104 is welded to a sleeve 116 rotatably mounted to shaft 102. Each bolt 126 extends through an aperture 118 in tine plate 110, extends through one of the cavities 112, extends through through-hole 128 of tine 120 and through washers, and is threaded into a nut 129.

In an alternate embodiment, each tine assembly 100a, 100b and 104 includes a circular attachment ring 130. Each bolt 126 extends through an aperture 132 in attachment ring 130, through aperture 118 in tine plate 110, through one of the cavities 112, extends through through-hole 128 of tine 120 and through washers and is threaded into nut 129. Attachment rings 130 of tine assemblies 100a and 100b are welded to shaft 102, while attachment ring 130 of tine assembly 104 is welded to sleeve 116. Thus, in this embodiment, tine plates 110 of tine assemblies 100a, 100b and 104 are free of attachment to shaft 102 and/or sleeve 116.

Thus, tine assemblies 100a, 100b and 104 can be easily manufactured and assembled and installed in turf aerator 10 as well as allow ease of replacement of tines 120 in the field. In particular, tines 120 are securely held in cavities 112 by a single bolt 129 and are completely exposed outside of cavities 112 without other components enclosing or sandwiching tines 120. Thus, tines 120 can be easily removed by simply removing a single bolt 126. Furthermore, tines 120, tine plates 110 as well as attachment rings 130 are easy to manufacture and assemble.

In the embodiments shown, chassis 12 of turf aerator 10 includes a rectangular opening 40 in top plate 28 spaced from side plates 14 and front and back plates 24 and 26 thereof and generally located over tine assemblies 100a, 100b and 104. A tine cover 50 is removably secured to chassis 12 and closes opening 40 in chassis 12. Tine cover 50 includes first and second side sheets 52 each having a seven sided cross section located outwardly of side plates 14 of chassis 12. Thus, tine cover 50 can be removably secured to chassis 12 by fasteners such as screws 54 extending through side sheets of tine cover 50 and threaded in or otherwise connected to side plates 14 of chassis 12. Further, front and back sheets 56 and 58 of tine cover 50 abut with top plate 28 of chassis 12 outwardly of opening 40. Tine cover 50 further includes a top sheet 60 extending between front and back sheets 56 and 58 and extending between side sheets 52. Front sheet 56 includes a first section 56a extending at an obtuse angle from top sheet 60 and generally perpendicular to side sheets 52. Front sheet 56 further includes a second section 56*b* extending from first section 56*a* generally perpendicular to side sheets 52 and parallel to and spaced from back sheet 58. Top sheet 60, side sheets 52, and back sheet 58 extend generally perpendicular to each other. Front and back sheets 56 and 58 abut with top plate 28 outwardly of opening 40. Side sheets 52 each have seven edges including an edge 52*a* interconnected to top sheet 60, an edge 52*b* interconnected to back sheet 58, edges 52*c* and 52*d* interconnected to first and second sections 52*a* and 52*b*, an edge 52*e* extending at an obtuse angle from edge 52*d* to a bottom edge 52*f* extending generally parallel to edge 52*a*, and an edge 52*g* extending at an obtuse angle from bottom edge 52*f* to edge 52*b*.

Figure 6:
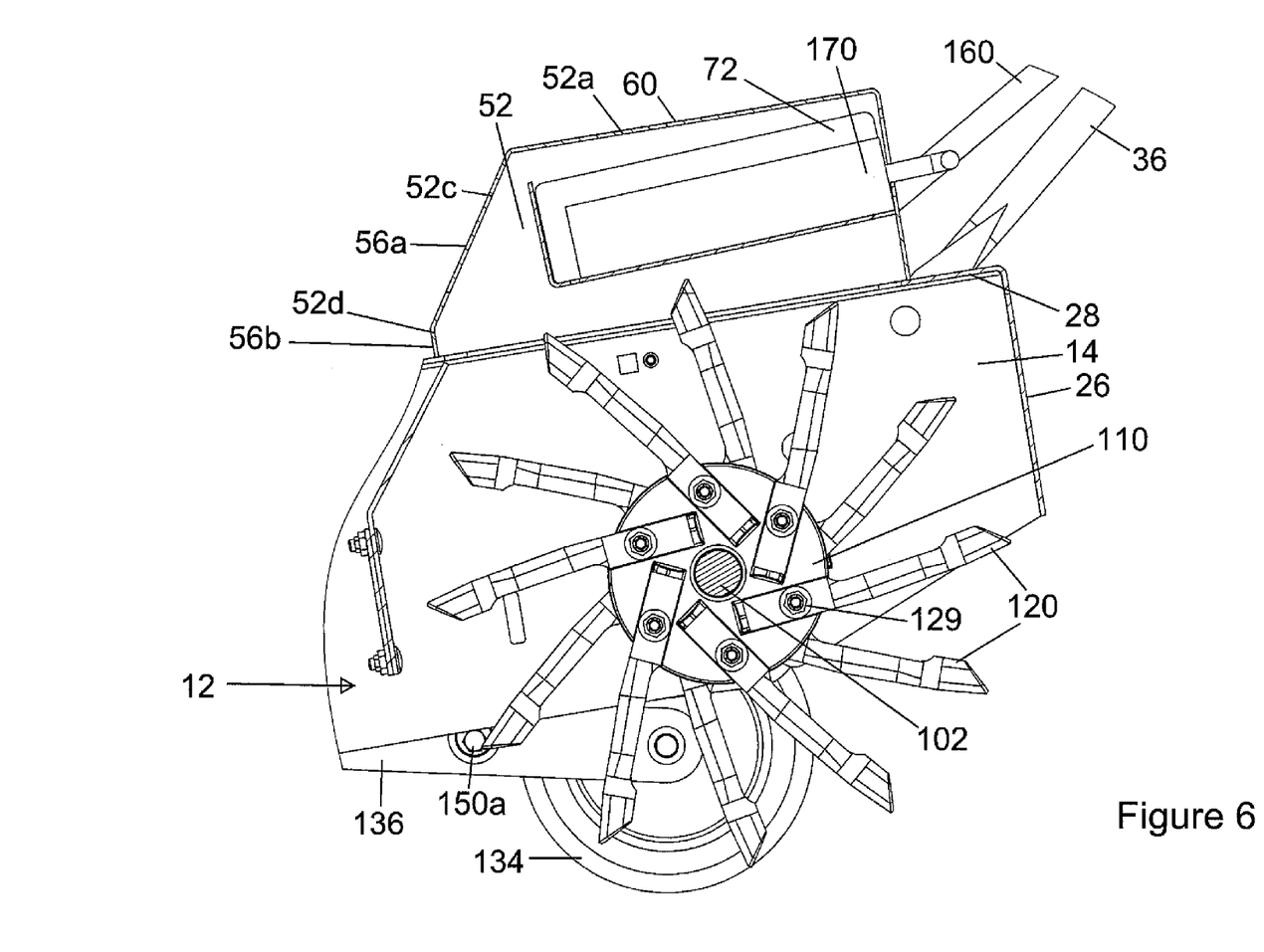
FIG. 6 shows a partial cross sectional view of the aerating apparatus of FIG. 2.

Removable weights 70 are received in cavities 72 formed in tine cover 50. In an embodiment shown, entrances 74 to cavities 72 are formed in side sheets 52 at the intersection of top sheet 60 and side sheet 52 and of back sheet 58 and side sheet 52. In an alternate embodiment, an entrance 76 to cavity 72 is formed in back sheet 58.

It should be appreciated that placement of removable weights 70 in removable tine cover 50 allows their placement to be generally centered over tine assemblies 100*a*, 100*b* and 104 to provide increased leverage which was not obtained by conventional turf aerators. Thus, increasing leverage allows more efficient use of the mass of removable weights 70 ensuring penetration of tines 120 into turf, and resulting in decreased operator fatigue and apparatus wear as well as increase maneuverability. Furthermore, removal of tine cover 50, preferably after removable weights 70 are removed therefrom, allows servicing of tine assemblies 100*a*, 100*b* and 104 from above and particularly not from below as in conventional turf aerators. Thus, tilting chassis 12 to provide access from underneath tine assemblies 100*a*, 100*b* and 104 as well as the inherent risk of an operator working beneath the turf aerators 10 and 10' as required in conventional turf equipment is avoided.

Figure 7A:
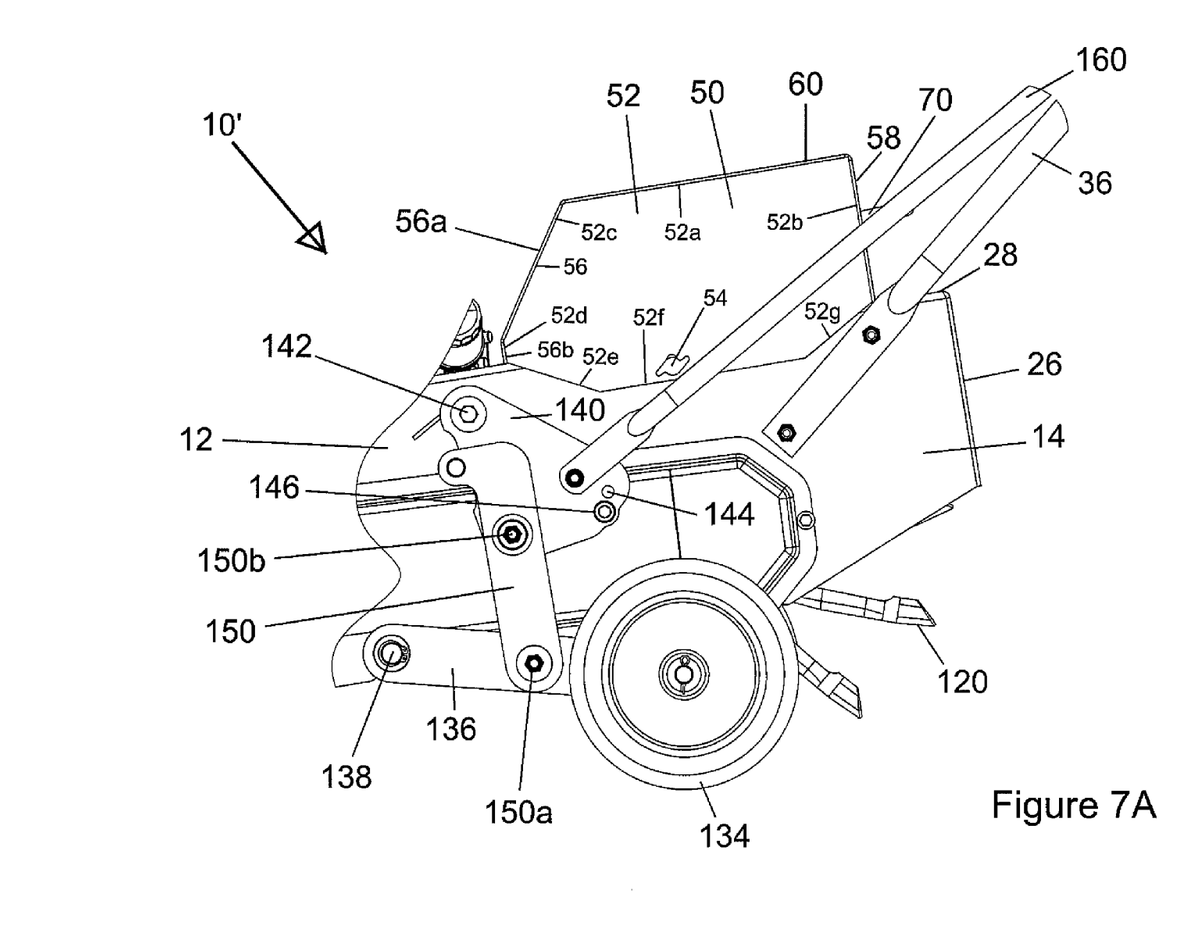
FIGS. 7A, 7B and 7C show partial side views of the aerating apparatus of FIG. 2.
Figure 7B:
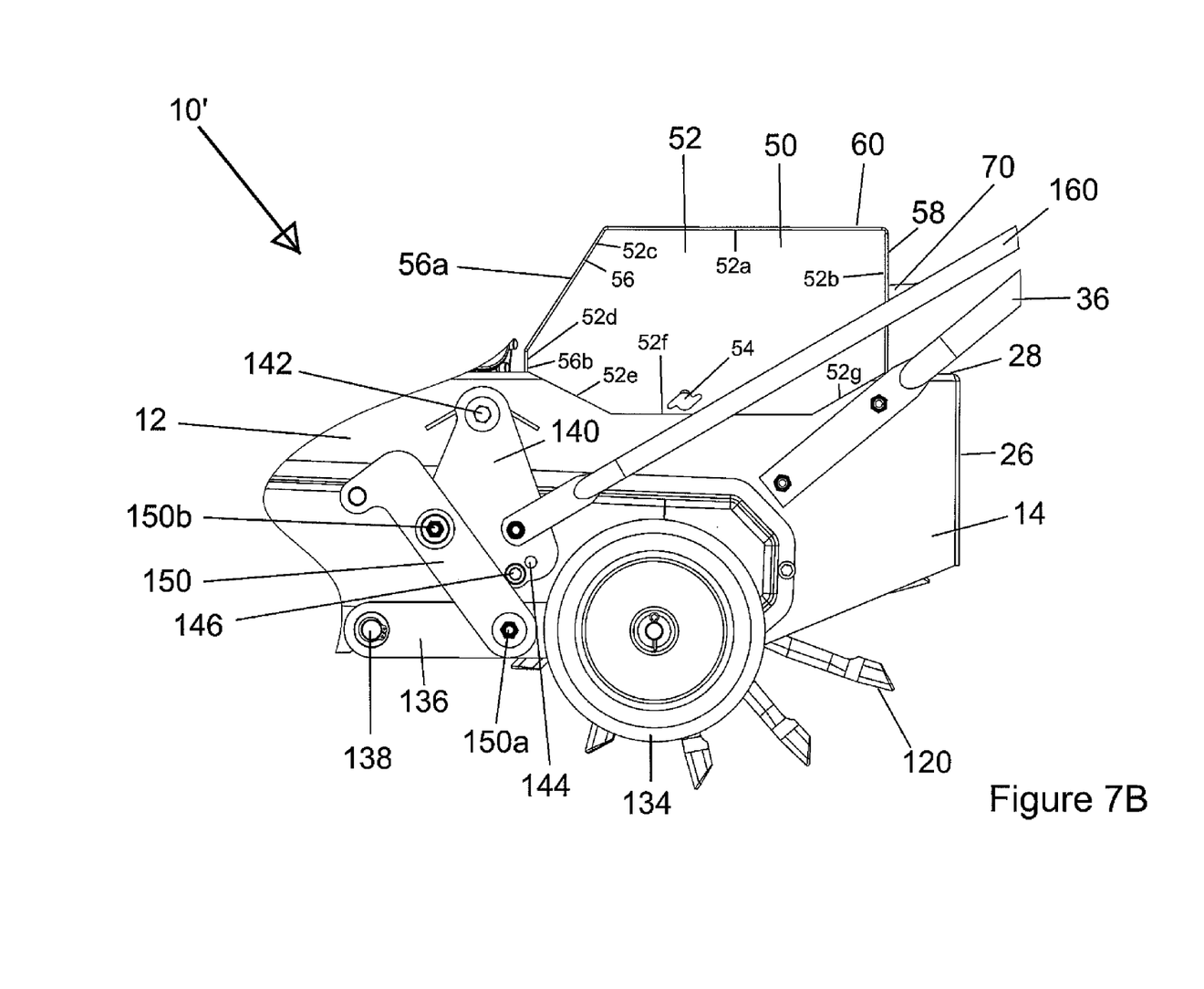
Figure 7C:
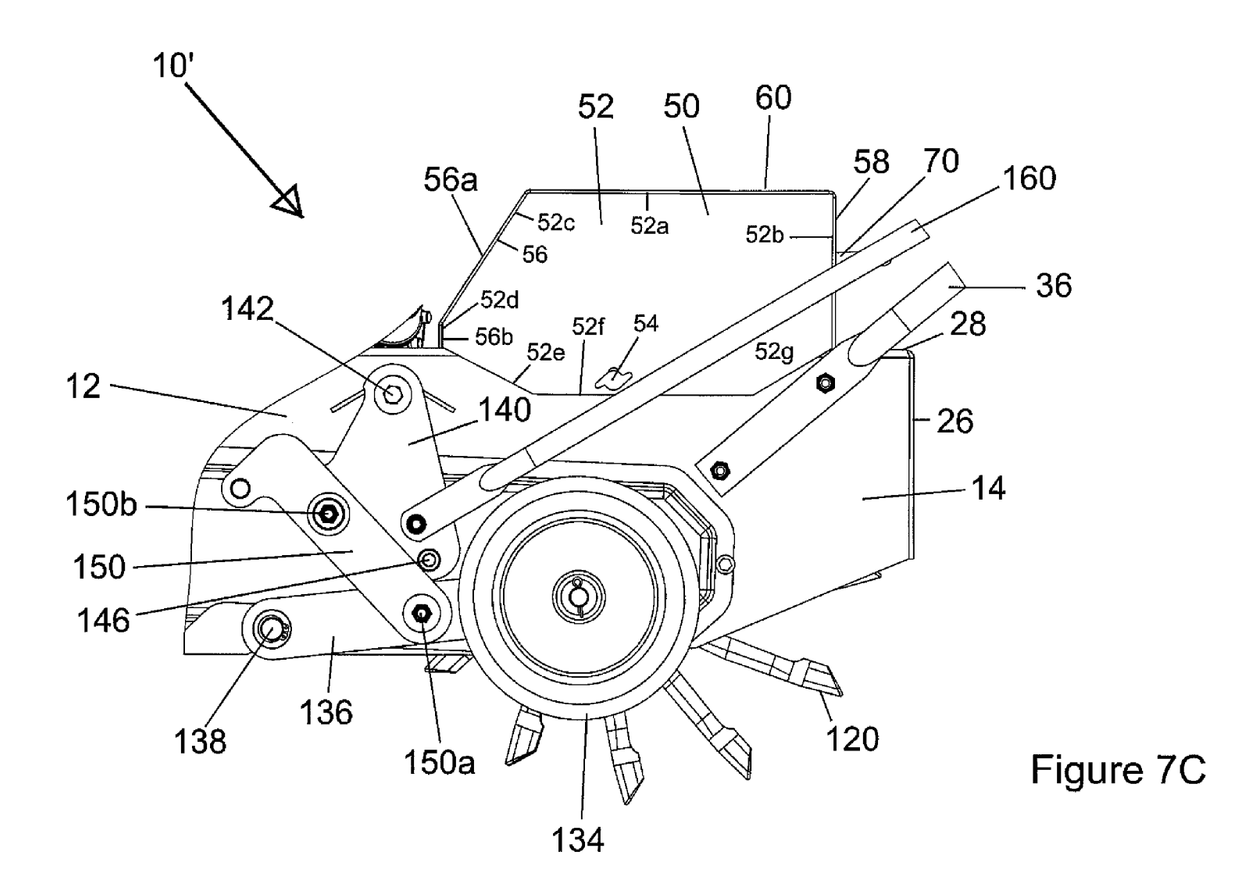

Turf aerator 10 and 10' can be configured in a transport position where transport wheels 134 are pivoted forward and underneath chassis 12. Specifically, each transport wheel 134 is rotatably mounted to an end of an arm 136 about a wheel axis, with arms 136 pivotally mounted by their opposite ends to chassis 12 about an arm axis 138 intermediate front plate 24 and the tine axis defined by shafts 102 and parallel to and spaced from and parallel to the wheel axes of wheels 134. Axis 138 is parallel to but spaced from the tine axis defined by shafts 102 and is located intermediate the tine axis defined by shafts 102 and front plate 24. The spacings of the wheel axes of wheels 134 and the tine axis defined by shafts 102 from axis 138 are generally equal.

A stop plate 140 is pivotally mounted to chassis 12 about a stop axis 142 spaced from and parallel to axis 138, the tine axis defined by shafts 102 and the wheel axes of wheels 134 and located intermediate and vertically above axis 138 and the wheel axes of wheels 134. Stop plate 140 is generally isosceles triangular shaped, with axis 142 located at the upper apex thereof. First and second threaded apertures 144 are located adjacent a lower apex of stop plate 140. A stop 146 is removably connected to and moveable with stop plate 140 by being threadably received in one of the first and second threaded apertures 144 in the form shown.

A lower end of an abutment bar 150 is pivotally mounted to arm 136 about a lower axis 150*a* parallel to and intermediate axis 138 and the wheel axes of transport wheels 134. Abutment arm 150 is further pivotally mounted to a lower apex of stop plate 140 about an upper axis 150*b* parallel to and spaced from axes 138 and 142, the wheel axes of transport wheels 134, and lower axis 150*a*.

A lower end of a lift tube 160 is pivotally mounted to stop plate 140 about an axis parallel to and spaced from axis 142 intermediate and aligned with axis 142 and threaded apertures 144. An upper end of lift tube 160 is pivotally mounted to a lift handle 162 in turn pivotally mounted to handlebar 36.

Abutment bar 150 and transport wheels 134 are movable between a transport position and an operational position. In the transport position, axis 150*b* is located intermediate a plane extending through axes 142 and 150*a* and transport wheels 134. In the operational position, the plane extending through axes 142 and 150*a* is located intermediate axis 150*b* and transport wheels 134. The extent that axis 150*b* is spaced from the plane extending through axes 142 and 150*a* is dependent upon abutment of stop 146 with abutment bar 150. Thus, by simply moving stop 146 between either the first and second threaded apertures 144, the extent that axis 150*b* is spaced, and thus the spacing of transport wheels 134 from chassis 12, is easily adjustable. Furthermore, since the force on stop 146 is in shear, stop 146 can be removed and replaced without the use of tools and in the form shown is simply rotated by the operator using fingers. Furthermore, due to the overcenter relationship of axis 150*b*, there is no need for a spring bias of the lift arrangement. Thus, turf aerator 10 and 10' includes a lifting arrangement which is very simple in design to thereby decrease cost and maintenance as well as allowing adjustment without the use of tools as described.

Handlebar 36 is utilized to steer chassis 12 along the turf, or in other words to direct chassis 12 in turning to the right or left on the turf as well as to tilt chassis 12 relative to the turf about wheels 30 or 134.

Although shown utilized in a single machine and believed to obtain synergistic results, it should be appreciated that such features can be used alone or in other combinations. As an example, the tine assembly arrangement could be utilized with conventional tine assemblies and/or without removable tine cover 50 as in the form shown. Similarly, the removable tine cover 50 could be utilized in conventional turf aerators with or without individually driven tine assemblies 100*a* and 100*b* and/or with conventional tine arrangements. Likewise, the tine assemblies 100*a*, 100*b* and 104 could be utilized in conventional turf aerators with or without individually driven tine assemblies and/or without removable tine cover 50 as in the form shown.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. Turf aerator comprising, in combination:
   a chassis including front and back plates, with the chassis being movably supported on turf adjacent to the front plate of the chassis;
   a handlebar extending from the chassis in a direction away from the front plate;
   a motor mounted on the chassis adjacent to the front plate;

a tine assembly rotatably mounted to the chassis about a tine axis adjacent to the back plate, with the tine assembly being driven by the motor;

first and second arms having first and second ends, with the first ends of the first and second arms pivotally mounted about an arm axis to the chassis intermediate the front plate and the tine axis;

first and second transport wheels rotatably mounted about wheel axes to the second ends of the first and second arms, with the wheel axes being spaced from the arm axis;

a stop plate pivotally mounted to the chassis about a stop axis parallel to and spaced from the arm, wheel and tine axes, with the stop plate including a stop connected thereto and moveable therewith; and an abutment bar pivotally mounted to one of the first and second arms about a lower axis parallel to, spaced from, and intermediate the arm and wheel axes, with the abutment bar being pivotally mounted to the stop plate about an upper axis parallel to, spaced from and intermediate the stop and lower axes; wherein the stop plate is pivotal between a transport position and an operational position, with the upper axis located intermediate a plane extending through the stop and lower axes and the wheel axes in the transport position, with the plane located intermediate the upper axis and the wheel axes in the operational position, with the stop abutting the abutment bar in the operational position and being spaced from the abutment bar in the transport position.

2. The turf aerator of claim 1 wherein the tine assembly comprises, in combination:

first and second shafts each having an inner end and an outer end, with the first and second shafts being independently rotatable about an axis, with the inner ends located intermediate the outer ends;

first and second inner tine assemblies secured to the first and second shafts adjacent to the inner ends of the first and second shafts, with the first and second inner tine assemblies being rotatable with the first and second shafts;

first and second outer tine assemblies rotatably mounted to the first and second shafts and located intermediate the first and second inner tine assemblies and the outer ends of the first and second shafts; and third and fourth inner tine assemblies secured to and rotatable with the first and second shafts, with the third inner tine assembly located intermediate the first inner and outer tine assemblies and the fourth tine assembly located intermediate the second inner and outer tine assemblies.

3. The turf aerator of claim 2 wherein the first and second shafts are independently driven at the outer ends outwardly of the first and second outer tine assemblies.

4. The turf aerator of claim 1 wherein the tine assembly comprises, in combination:

a tine plate including a plurality of non-intersecting, generally semi-circular cross section cavities;

a plurality of tubular tines, with each tubular tine received in one of the plurality of cavities; and a bolt extending diametrically through each tubular tine, extending through the one of the plurality of cavities, and connected to the tine plate;

wherein each tubular tine is in a form of a flat sheet bent into a tubular shape and having abutting edges, with the abutting edges each including a cutout to define a rear opening in the tubular shape, with a through hole extending diametrically through the tubular shape of the tubular tine and generally at 90° to the abutting edges, with the bolt extending through the through hole, with the plurality of cavities extending along chords spaced from, but parallel to, diameters of the tine plate.

5. The turf aerator of claim 4 further comprising, in combination:

an attachment ring, with each bolt connected to the tine plate.

6. The turf aerator of claim 5 further comprising, in combination: a shaft, with the attachment ring welded to the shaft, with the tine plate being free of direct attachment to the shaft.

7. The turf aerator of claim 5 further comprising, in combination: a sleeve adapted to be rotatably mounted on a shaft, with the attachment ring welded to the sleeve, with the tine plate being free of direct attachment to the sleeve.

8. The turf aerator of claim 1 further comprising, in combination:

a removable weight, with the chassis including first and second side plates and a top plate extending between the first and second side plates and between the front and back plates, with the front and back plates extending between the first and second side plates, with the chassis being movably supported on turf adjacent to the front plate of the chassis, with the motor mounted on the top plate adjacent to the front plate, with the tine assembly rotatably mounted to the chassis between the first and second side plates and adjacent to the back plate, an opening formed in the top plate intermediate the first and second side plates, intermediate the front and back walls, intermediate the motor and the back plate, and extending over the tine assembly; and a tine cover removably secured to the chassis and closing the opening in the top plate, with the tine cover including a cavity slideably receiving the removable weight, with the removable weight received in the cavity extending over the tine assembly intermediate the first and second side plates.

9. The turf aerator of claim 8 wherein the tine cover includes a back sheet, a top sheet extending from the back sheet, and first and second side sheets extending from the back sheet and the top sheet, with the first and second side sheets located outwardly of and extending over the first and second sides, with the tine cover being removably secured to the chassis by fasteners extending between the first and second side sheets and the first and second side plates, wherein the opening is spaced from the first and second side plates and from the front and back walls; wherein the back, top, and side sheets extend perpendicular to each other; wherein the tine cover includes a front sheet including a first section extending at an obtuse angle from the top sheet and generally perpendicular to the first and second side sheets; wherein the front sheet includes a second section extending from the first section, generally perpendicular to the first and second side sheets, and parallel to and spaced from the back sheet, with the first and second side sheets having seven edges including edges interconnected to the back and top sheets and the first and second sections, a front edge extending at obtuse angle from the interconnection of the second section and the first and second side sheets to a bottom edge spaced from and parallel to the top sheet, and a back edge extending at an obtuse angle from the interconnection of the back sheet and the first and second side sheets to the bottom edge.

10. The turf aerator of claim 9 wherein an entrance to the cavity is located in one of the first and second side sheets of the cover.

11. The turf aerator of claim 9 wherein an entrance to the cavity is located in the back sheet.

12. The turf aerator of claim 1 wherein the stop is removably connected to the stop plate without the use of tools between first and second positions, with an extent of the upper axis from the plane being different when the stop abuts with the abutment bar in the first and second locations.

13. The turf aerator of claim 12 further comprising, in combination: a lift tube pivotally mounted to the stop plate; and a lift handle pivotally mounted to the handlebar, with the lift tube pivotally mounted to the lift handle spaced from the handlebar and the stop plate.

14. The turf aerator of claim 1 further comprising, in combination: a lift tube having a lower end pivotally mounted to the stop plate about a lift axis spaced from and parallel to the upper and stop axes, with the lift axis being intermediate the stop and the stop axis.

15. The turf aerator of claim 14 wherein the stop plate is generally isosceles triangular shaped, having upper, lower and front apexes, with the stop axis located at the upper apex, with the stop located at the lower apex, and with the upper axis located at the front apex.

16. The turf aerator of claim 15 wherein the stop plate includes first and second threaded apertures at the lower apex, and wherein the stop is removably connected to and moveable with the stop plate by being threadably received in one of the first and second threaded apertures.

17. The turf aerator of claim 16 further comprising, in combination: a lift handle pivotally mounted to the handlebar, with the lift tube pivotally mounted to the lift handle spaced from the handlebar and the stop plate.

* * * * *